United States Patent
Inoue

(10) Patent No.: US 9,016,724 B2
(45) Date of Patent: Apr. 28, 2015

(54) VEHICLE SPLASH GUARD

(71) Applicant: Suzuki Motor Corporation, Hamamatsu (JP)

(72) Inventor: Yoshiaki Inoue, Hamamatsu (JP)

(73) Assignee: Suzuki Motor Corporation, Hamamatsu (JP)

( * ) Notice: Subject to any disclaimer, the term of this patent is extended or adjusted under 35 U.S.C. 154(b) by 0 days.

(21) Appl. No.: 13/953,137

(22) Filed: Jul. 29, 2013

(65) Prior Publication Data

US 2014/0035270 A1 Feb. 6, 2014

(30) Foreign Application Priority Data

Aug. 6, 2012 (JP) ................................ 2012-174224

(51) Int. Cl.
  *B62D 25/18* (2006.01)
  *B62D 25/16* (2006.01)
  *B60R 13/04* (2006.01)
(52) U.S. Cl.
  CPC ............... *B62D 25/18* (2013.01); *B62D 25/16* (2013.01); *B60R 13/04* (2013.01); *B60R 2013/046* (2013.01)
(58) Field of Classification Search
  CPC .. B62D 25/188; B62D 25/163; B62D 25/168; B62D 25/18
  USPC ............................ 280/851, 848, 154, 850, 852
  See application file for complete search history.

(56) References Cited

U.S. PATENT DOCUMENTS

| | | | | |
|---|---|---|---|---|
| 7,040,682 B2 * | 5/2006 | Tokumoto et al. | ............ | 296/209 |
| 7,168,757 B2 * | 1/2007 | Futatsuhashi | ................ | 296/209 |
| 7,523,982 B2 * | 4/2009 | Yamaguchi | ................... | 296/209 |
| 7,896,397 B2 * | 3/2011 | Rompage et al. | ............ | 280/848 |
| 8,007,148 B2 * | 8/2011 | Yamauchi et al. | ............ | 362/501 |
| 8,322,110 B2 * | 12/2012 | Chou et al. | ................... | 52/716.5 |
| 2003/0122364 A1 * | 7/2003 | Muramatsu | ................... | 280/851 |
| 2005/0241259 A1 * | 11/2005 | Rijsbergen et al. | ......... | 52/716.1 |
| 2006/0028056 A1 * | 2/2006 | Aizawa et al. | ................ | 296/209 |
| 2007/0085361 A1 * | 4/2007 | Hauser | ........................ | 296/1.08 |

FOREIGN PATENT DOCUMENTS

| | | |
|---|---|---|
| JP | 2003-054455 | 2/2003 |
| JP | 2005-075056 | 3/2005 |

* cited by examiner

*Primary Examiner* — Hau Phan
(74) *Attorney, Agent, or Firm* — Silicon Valley Patent Group LLP

(57) ABSTRACT

A splash guard includes an elongate portion that extends along a side sill, and a rear wall that protrudes from a rear end of the elongate portion into a rear wheel house, wherein the rear wall covers a first flange formed by folding over an edge of the rear wheel house to a vehicle inner side, and a second flange formed by folding over an edge of the side body outer panel into the rear wheel house so as to overlap the rear side of the first flange, the rear wall covering the first flange and the second flange from behind with a clearance disposed therebetween. The splash guard further includes a pedestal formed protruding from a region nearby the rear end of the elongate portion toward the side body outer panel, and a coupling portion that couples the pedestal to the rear wall.

7 Claims, 10 Drawing Sheets

ARROW X VIEW

B-B

C-C

VEHICLE SPLASH GUARD

CROSS-REFERENCE TO PENDING PROVISIONAL APPLICATION

This application claims the benefit of and priority to Japanese Application No. 2012-174224 filed Aug. 6, 2012 and entitled "Vehicle splash guard", which is assigned to the assignee hereof and which is incorporated herein by reference.

BACKGROUND

I. Field of the Invention

This disclosure relates to a vehicle splash guard, which covers a side sill of a side body outer panel constituting a side face of a vehicle, the side sill extending between a front wheel house and a rear wheel house.

II. Background

Side sills are doorsill portions that extend between a front wheel house and a rear wheel house of a vehicle side face. Vehicle splash guards are known that protect such side sills from splashing rain water, small pebbles and the like, and that also have a decorative function.

A flange is formed by folding over the edge of the rear wheel house to the vehicle inner side. A flange is also formed by folding over the edge of a side body outer panel constituting the side face on both sides of the vehicle into the rear wheel house. The splash guard has a rear wall that protrudes from its rear end into the rear wheel house and this rear wall covers the rear side of the flanges. Thus, also these flanges, which are sheet-metal components that are formed in the rear wheel house, are protected by the splash guard from splashing rain water, small pebbles and the like.

As disclosed in Japanese Patent Laid-open Publication No. 2003-54455 and Japanese Patent Laid-open Publication No. 2005-75056, for example, the rear wall of the splash guard is fixed to the flanges by a fixing means, such as a clip. This is in order to prevent that the rear wall of the splash guard undesirably comes in touch with the flanges due to vibrations, thermal expansion/contraction or the like, causing noise or damage.

A sealer is sometimes applied to the end of the flanges made of sheet-metal to which the splash guard is fixed. This is in order to prevent rain water or the like from intruding between the flanges, so that no corrosion occurs at the flanges made of sheet-metal.

However, since the location where the clip is fixed interferes with the location where the sealer is applied, the space for fixing the clips cannot be ensured. This may be addressed by extending the flanges and moving the location where the sealer is applied to the vehicle inner side, ensuring the space for fixing the clip, but with this countermeasure, there is the risk that the weight of the extended sheet-metal flange increases, and the yield deteriorates.

On the other hand, if the rear wall is not fixed with a clip to a sheet-metal component, then the gap between the rear wall and the sheet-metal component must be held by another means. Incidentally, if it is attempted to arrange a sponge or the like in the gap to ensure the gap, then the number of components increases, thus also increasing costs.

In view of the foregoing issues, it is an object of the present invention to provide a vehicle splash guard with which a gap between a sheet-metal component and a rear wall of the splash guard can be maintained without impeding the application of a sealer to the sheet-metal component positioned at the edge of the rear wheel house of the vehicle, and without increasing the weight or costs.

SUMMARY OF THE DISCLOSURE

In order to solve this problem, in one aspect of the invention, a vehicle splash guard covering a side sill of a side body outer panel constituting a side face of a vehicle is provided, the side sill extending between a front wheel house and a rear wheel house, the vehicle splash guard including: an elongate portion that extends along the side sill; and a rear wall that protrudes from a rear end of the elongate portion into the rear wheel house; wherein the rear wall covers a first flange formed by folding over an edge of the rear wheel house to a vehicle inner side, and a second flange formed by folding over an edge of the side body outer panel into the rear wheel house so as to overlap the rear side of the first flange, the rear wall covering the first flange and the second flange from behind with a clearance disposed therebetween; the vehicle splash guard further comprising: a pedestal formed protruding from a region nearby the rear end of the elongate portion toward the side body outer panel, a clip that is inserted into the side body outer panel being fixed to the pedestal; and a coupling portion that couples the pedestal to the rear wall.

With this aspect of the invention, the rigidity of the rear portion of the splash guard is increased through the coupling portion that is formed in a single piece with the splash guarded, stabilizing its shape. That is to say, the rear wall that is coupled to the pedestal by the coupling portion can cover the flanges while maintaining a constant clearance, and without being removed from the first flange and the second flange or coming so close to them that there is a risk of contact. Consequently, components, such as clips, that fix the rear wall to the first flange and the second flange, which were conventionally required, are unnecessary. That is to say, even without such a fixation, the clearance between the flanges and the rear wall is maintained, so that the rear wall can protect these flanges without the occurrence of noise or damage.

In particular if a sealer for preventing corrosion is applied to the end of the overlapping first flange and second flange, the above-noted effect that the fixation of the rear wall of the splash guard is unnecessary becomes even more pronounced. If it were necessary to fix the rear wall with clips or the like to the two flanges, then the countermeasure of extending the two flanges would have to be taken in order to prevent that the location where the clip is fixed interferes with the location where the sealer is applied. However, with this aspect of the present invention, this countermeasure is not necessary, so that it is possible to prevent an increase in weight due to the extension of the flanges. Moreover, it can also be prevented that extending the two flanges worsens the yield of the side body outer panel or the panel constituting the rear wheel house due to the extension of the flanges.

Moreover, with this aspect of the invention, it is not necessary to arrange a sponge or the like for preventing contact in the clearance between the two flanges and the rear wall. Also with regard to this aspect, a reduction of the number of parts is achieved.

The coupling portion may include a plurality of connected planar walls having a straight cross-section when viewed from a vehicle longitudinal direction. For example, the plurality of connected planar walls may include a first wall that faces the side body outer panel and a second wall that extends toward the elongate portion from an end of the first wall. Compared to the case that the pedestal is coupled to the rear wall by a single planar wall, this increases the rigidity of the coupling portion, so that also the rigidity of the rear end of the splash guard is increased.

The coupling portion may include a curved wall having a cross-section that curves convexly toward the side body outer panel when viewed from a vehicle longitudinal direction.

A gap of a predetermined clearance may be provided between the coupling portion and the side body outer panel, and the vehicle splash guard may further comprise a double-sided adhesive tape that is inserted into the gap and adheres the coupling portion to the side body outer panel.

With this configuration, the elongate portion of the splash guard is fixed to the side body outer panel at a position that is closer to the rear end than the clip of the pedestal, so that the rear end of the splash guard, such as the rear wall, can be positioned reliably.

The coupling portion may be coupled at least to a middle region, with respect to the vertical direction, of the rear wall. With this configuration, the shape of the middle region, with respect to the vertical direction, of the rear wall can be stabilized.

With some aspects of the present invention, a vehicle splash guard is provided with which a gap between a sheet-metal component and a rear wall of the splash guard can be maintained without impeding the application of a sealer to the sheet-metal component positioned at the edge of the rear wheel house of the vehicle, and without increasing the weight or costs.

DETAILED DESCRIPTION

Figure 1:
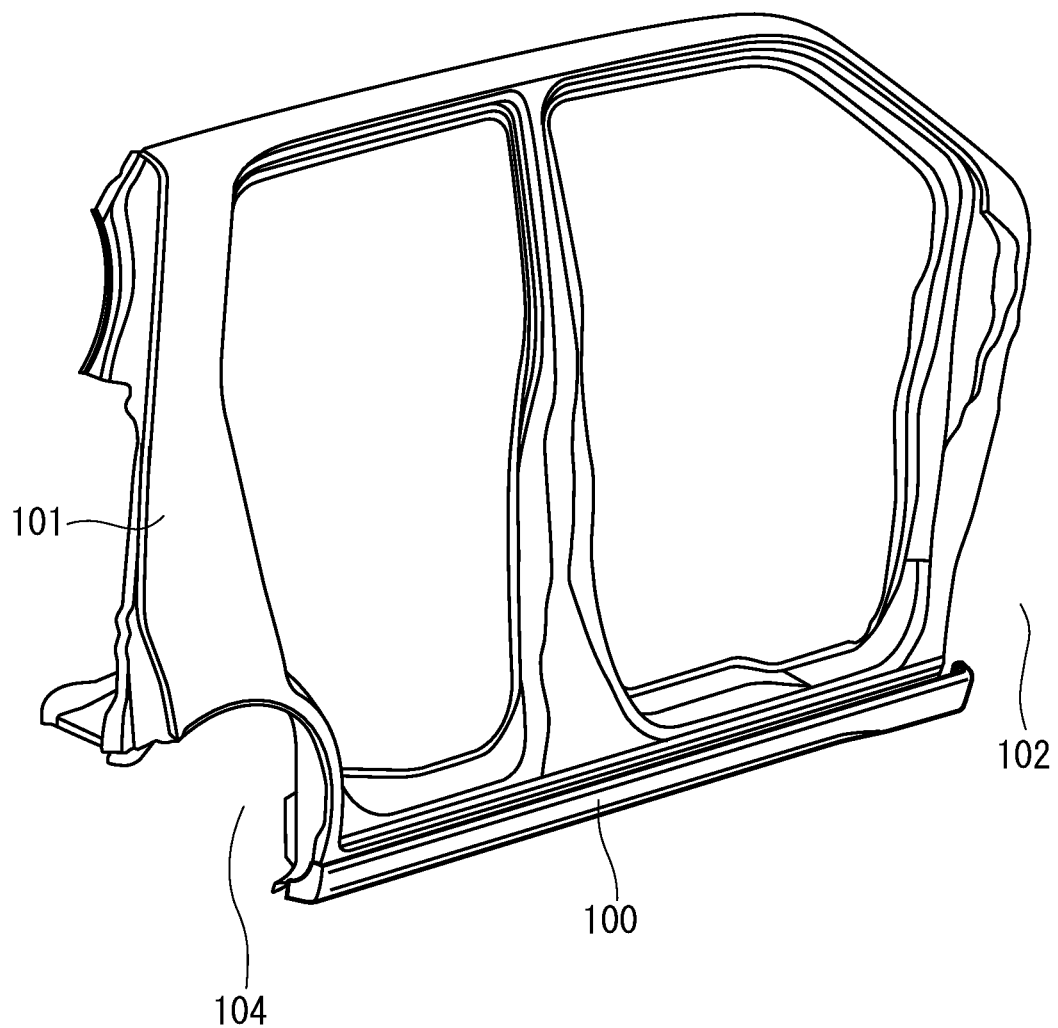
FIG. 1 is a perspective view of a side body outer panel constituting a side face of a vehicle, to which an embodiment of a vehicle splash guard according to the present invention is applied.

Preferred embodiments of the present invention will now be described in detail below in reference to the accompanying drawings. Dimensions, materials, specific numerical values, etc. provided in the embodiments are merely illustrative to help understand the invention, and are not to limit the present invention unless indicated otherwise. In the specification and the drawings, elements that have essentially the same function or configuration are given the same numerical references to avoid repetitions in the description, and elements that are not directly related to the present invention are not shown in the drawings.

Splash Guard

FIG. 1 is a perspective view of a side body outer panel constituting a side face of a vehicle, to which an embodiment of a vehicle splash guard according to the present invention is applied. The splash guard 100 covers a side sill 106 (see FIG. 3) of a side body outer panel 101, the side sill 106 extending between a front wheel house 102 and a rear wheel house 104. Thus, the splash guard 100 protects the side sill 106 from splashing rain water, small pebbles and the like, and has also a decorative function.

Figure 2:
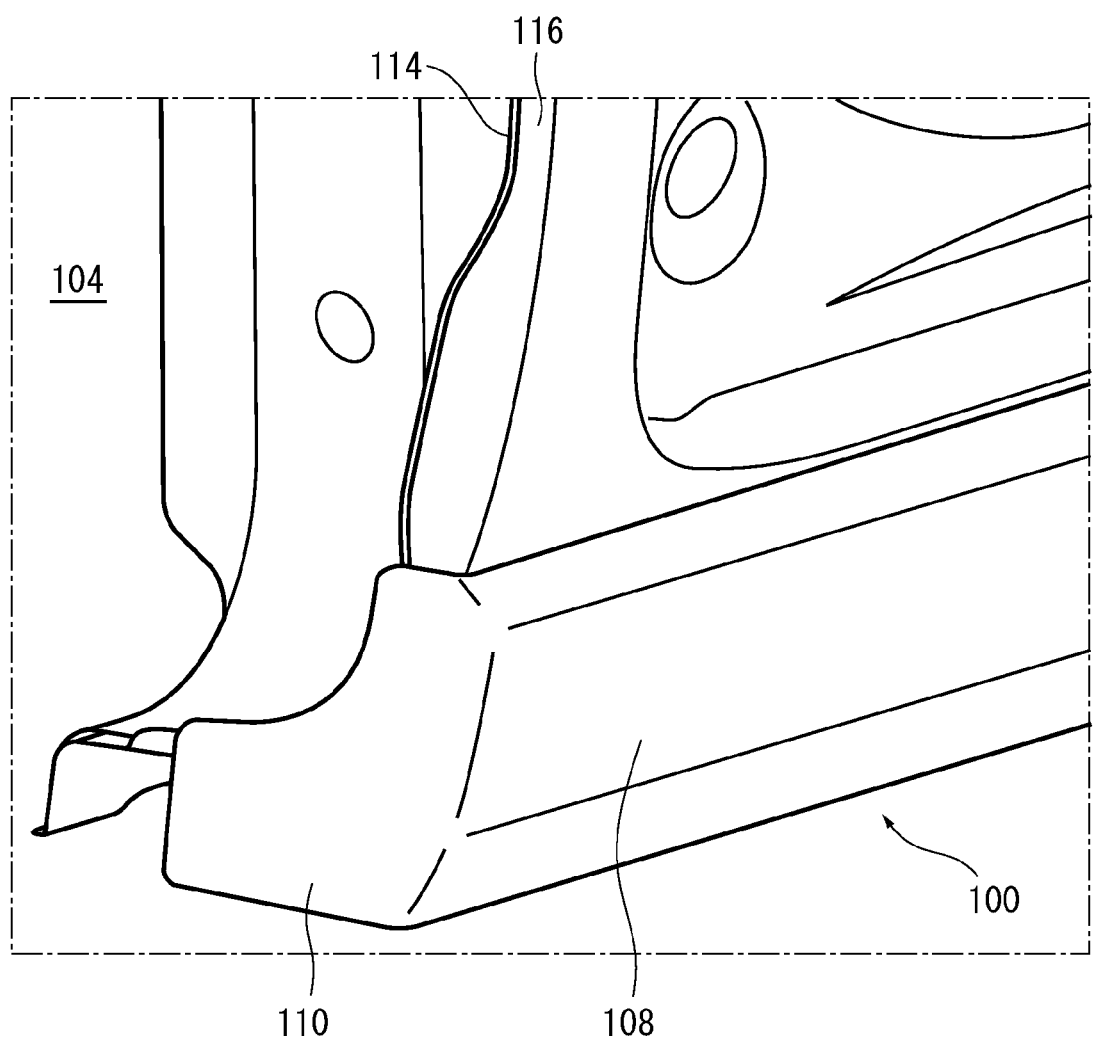
FIG. 2 is a partially enlarged view of FIG. 1.
Figure 3:
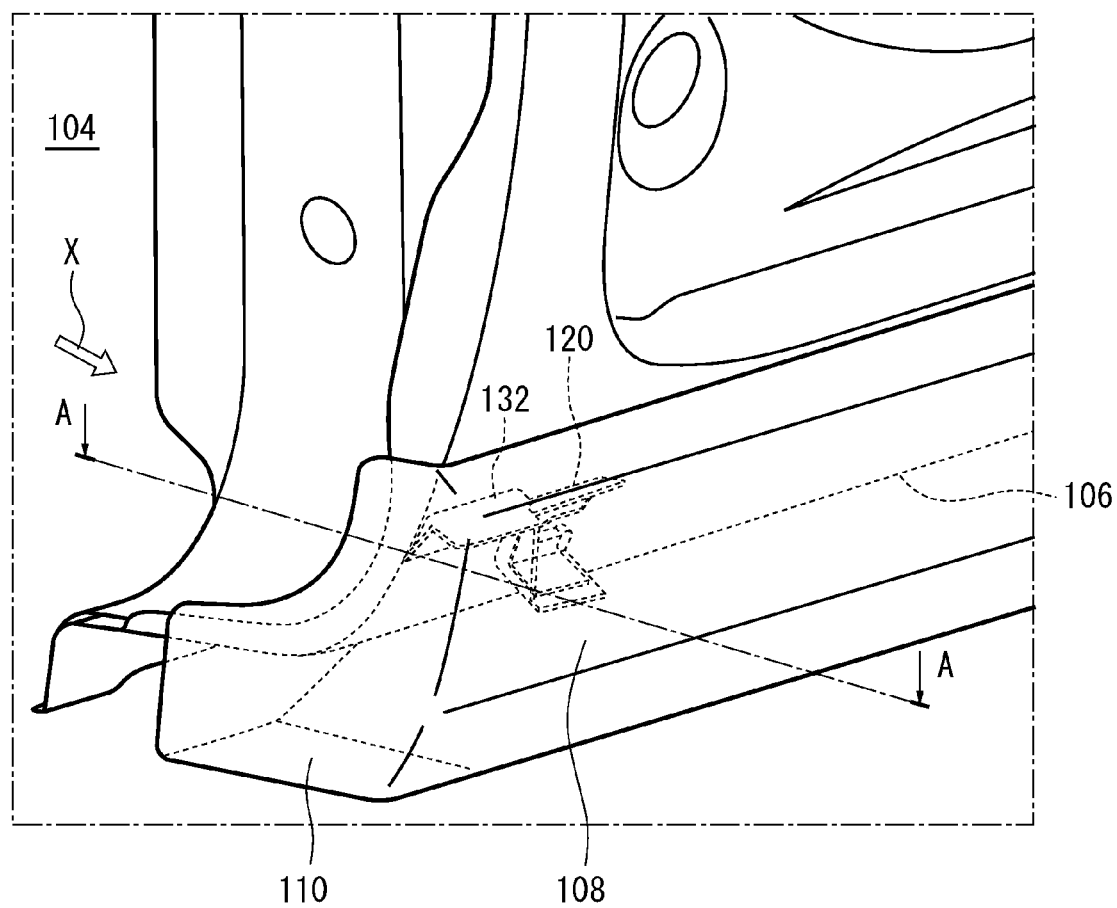
FIG. 3 is a partially transparent view of FIG. 2.

FIG. 2 is a partially enlarged view of FIG. 1. FIG. 3 is a partially transparent view of FIG. 2, where the splash guard 100 is shown transparently. As shown in FIG. 2 and FIG. 3, the splash guard 100 includes an elongate portion 108 that extends along the side sill 106, and a rear wall 110 that protrudes inward from the rear end of the elongate portion 108 into the rear wheel house 104.

Figure 4:
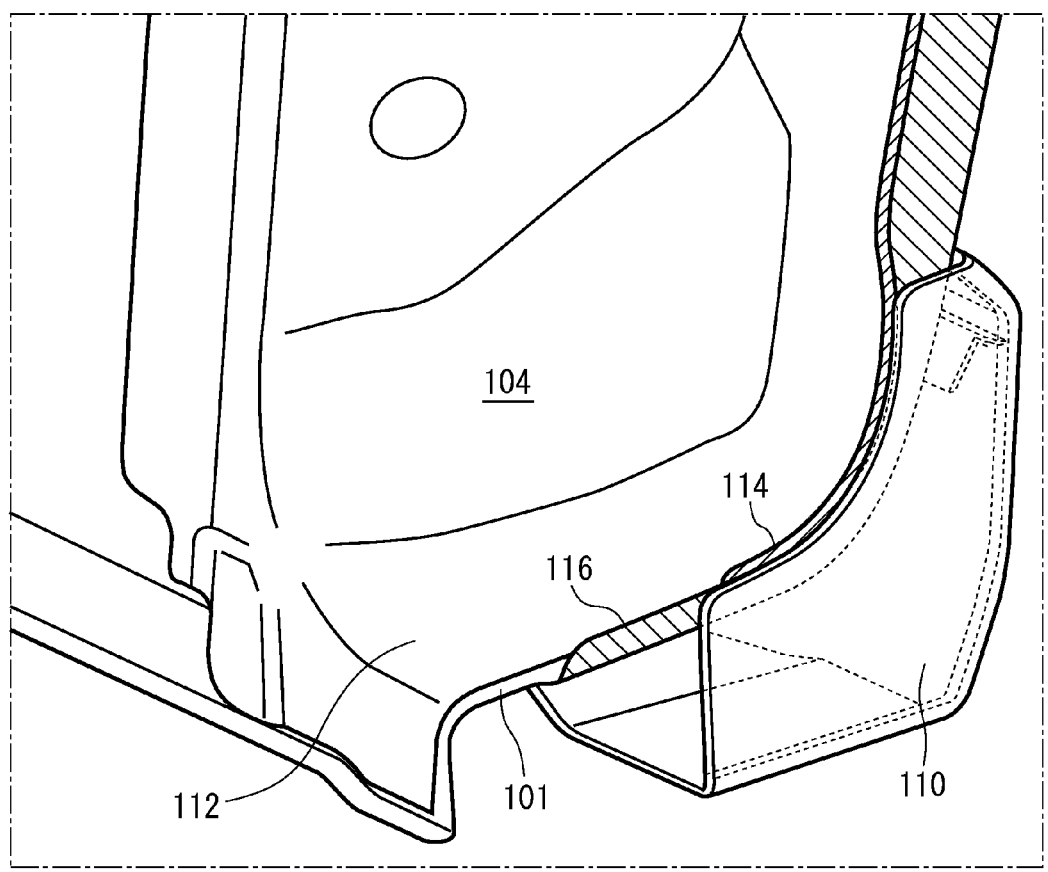
FIG. 4 is a view taken from the direction of arrow X in FIG. 3.

FIG. 4 is a view taken from the direction of arrow X in FIG. 3, that is, seen from the inside of the rear wheel house 104. The rear wheel house 104 is formed of a rear wheel house inner panel (omitted from the drawings), and a rear wheel house outer panel 112, which are arranged, overlapping each other, on the vehicle inner side and the vehicle outer side with respect to the vehicle width direction.

The edge of the rear wheel house outer panel 112 is folded over to the vehicle inner side, and this folded portion constitutes a first flange 114. The edge of the side body outer panel 101 is folded over into the rear wheel house 104, and this folded portion constitutes a second flange 116. In FIG. 4, the first flange 114 and the second flange 116 are both shown for illustrative reasons as hatched portions.

Figure 5:
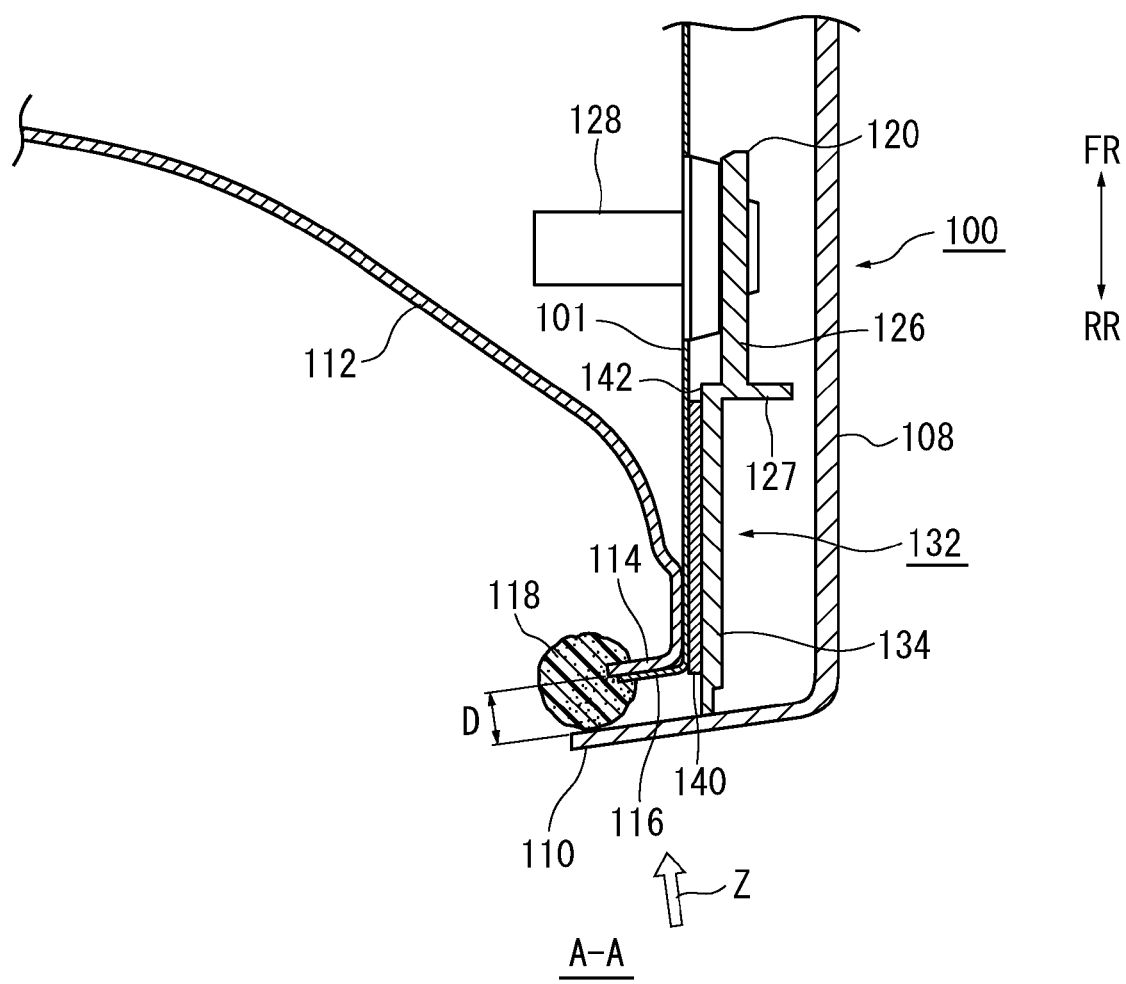
FIG. 5 is a sectional view along A-A in FIG. 3.

FIG. 5 is a sectional view along A-A in FIG. 3. In the figures of the present application, the vehicle front direction is denoted as "FR" and the vehicle rear direction is denoted as "RR". As shown in these drawings, the second flange 116 overlaps the rear side of the first flange 114, and they are spot welded together. A resinous mastic sealer 118 is applied at the end of the first flange 114 and the second flange 116, tightly sealing any gap between the ends of the two flanges. The mastic sealer 118 prevents the entry of water between the two flanges 114 and 116 and thus prevents the corrosion due to the intrusion of water.

As shown in FIG. 5, the rear wall 110 of the splash guard 100 further covers the first flange 114 and the second flange 116, which overlap each other as explained above, from behind. Between the first and second flanges 114, 116 and the rear wall 110, a clearance D is provided that is of such a size that no contact occurs due to vibrations, thermal expansion/contraction or the like. The reason why the clearance D is provided, is to avoid the occurrence of noise and damage due to such contact.

Figure 6:
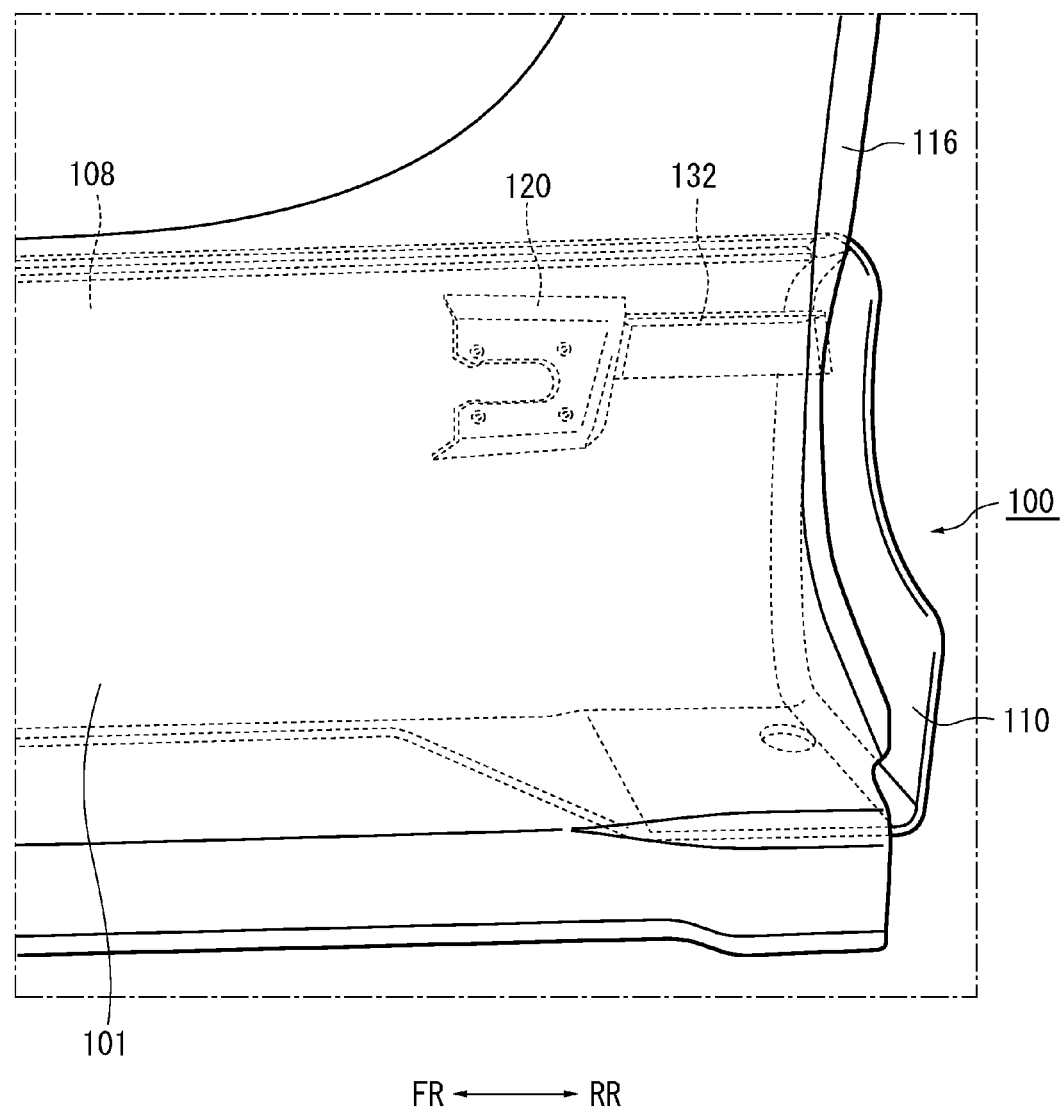
FIG. 6 is a diagram showing the side body outer panel in FIG. 3 as viewed from the vehicle inner side looking to the vehicle outer side in vehicle width direction.
Figure 7:
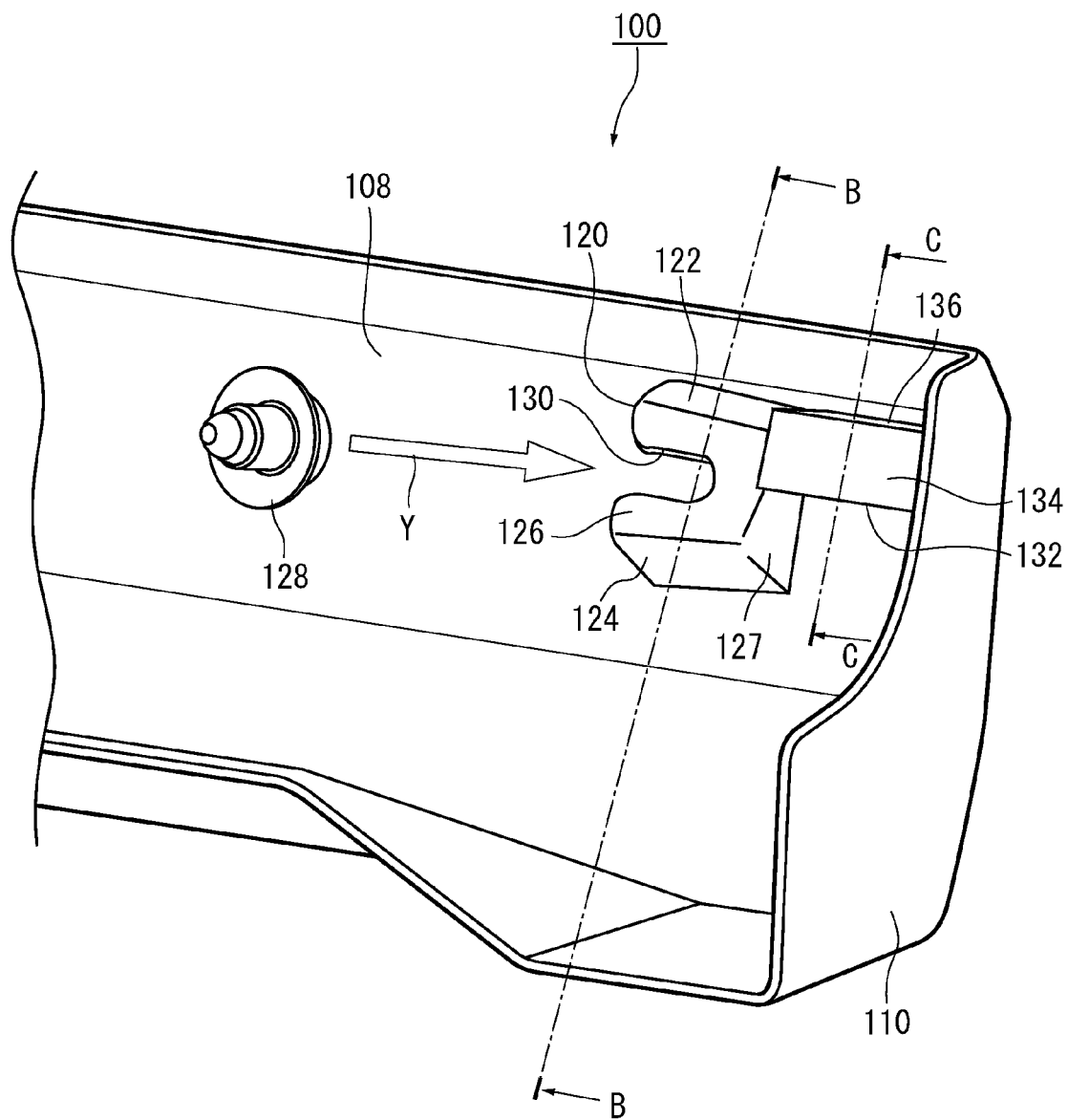
FIG. 7 is a perspective view of the splash guard in FIG. 6 alone, seen from the vehicle inner side.
Figure 8:
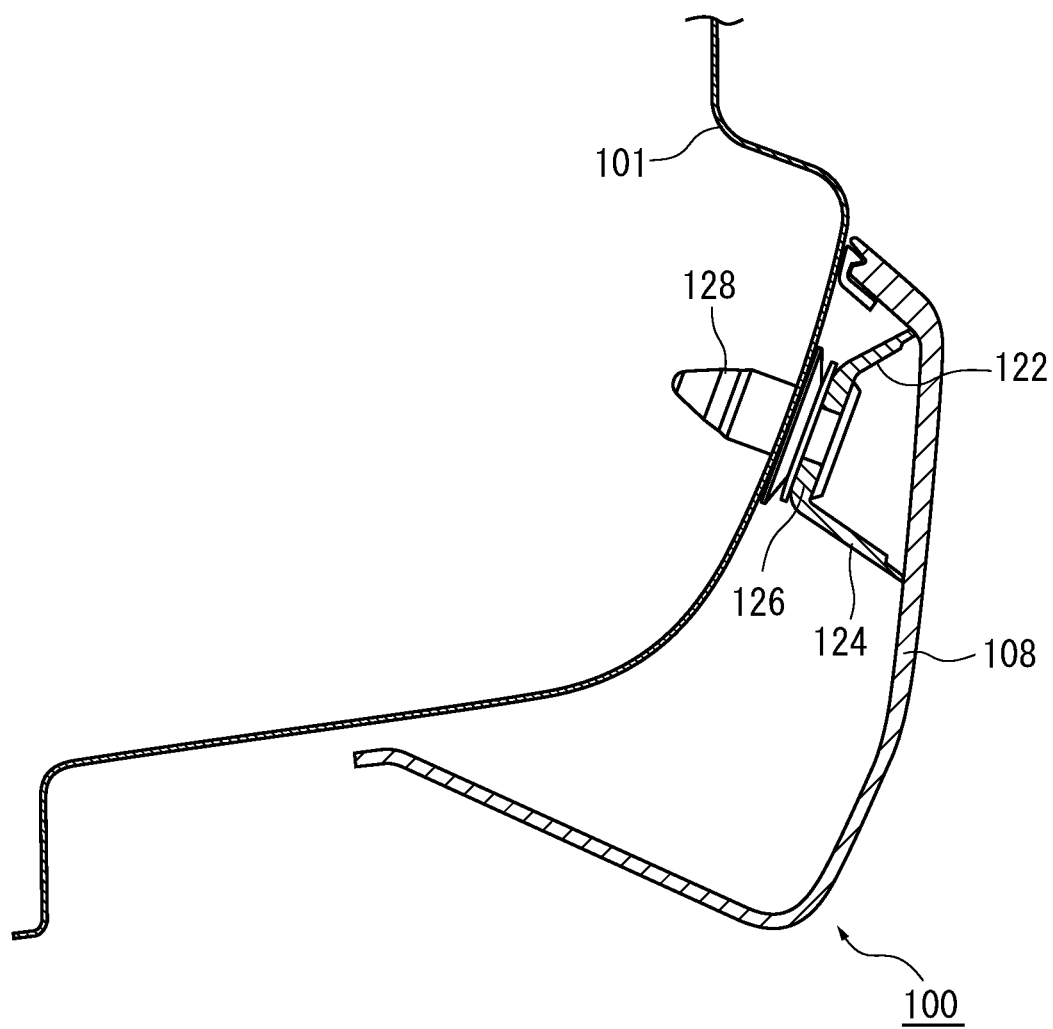
FIG. 8 is a sectional view along B-B in FIG. 7.

FIG. 6 is a diagram showing the side body outer panel 101 of FIG. 3 as viewed from the vehicle inner side looking to the vehicle outer side in vehicle width direction. In FIG. 6, the rear wheel house outer panel 112 overlapping the vehicle inner side of the side body outer panel 101 has been omitted from the drawing. Moreover, FIG. 6 is a partially transparent diagram, in which the splash guard 100 hiding the vehicle outer side of the side body outer panel 101 is shown transparently. FIG. 7 is a perspective view of the splash guard 100 in FIG. 6 alone, seen from the vehicle inner side. FIG. 8 is a sectional view along B-B in FIG. 7.

Pedestal

As shown in FIGS. 6 to 8, the splash guard 100 is provided with a pedestal 120. The pedestal 120 is formed protruding from a region nearby the rear end of the elongate portion 108 towards the side body outer panel 101. The pedestal 120 is a member to which a clip 128 can be attached that fixes the splash guard 100 and the side body outer panel 101.

As shown in FIG. 7, the pedestal 120 includes an upper wall 122 and a lower wall 124 that are raised from the inner side of the elongate portion 108 at a distance in vertical direction, a vertical wall 126 that connects these in vertical direction, and a rear end wall 127 that joins the rear edges of the upper wall 122, the lower wall 124 and the vertical wall 126 together. A long hole 130 for accommodating a shaft of a clip 128 in the direction shown by arrow Y is cut out at the front edge of the vertical wall 126. As shown in FIG. 8, the clip 128 accommodated in the long hole 130 is inserted into the side body outer panel 101, and fixes the splash guard 100 to the side body outer panel 101.

While omitted from the drawings, the splash guard 100 is provided with a plurality of pedestals like the pedestal 120 arranged at predetermined intervals over the entire length of the elongate portion 108. Like the pedestal 120, all of these pedestals fix the splash guard 100 with clips. The pedestal 120 is the most rearward of these pedestals. In the most rearward pedestal 120, the long hole 130 is cut out at the front edge of the upper wall 122, but at the other pedestals (not shown in the drawings), a similar long hole may be cut out at either the front or the rear edge of the upper wall.

Coupling Portion

Figure 9A:
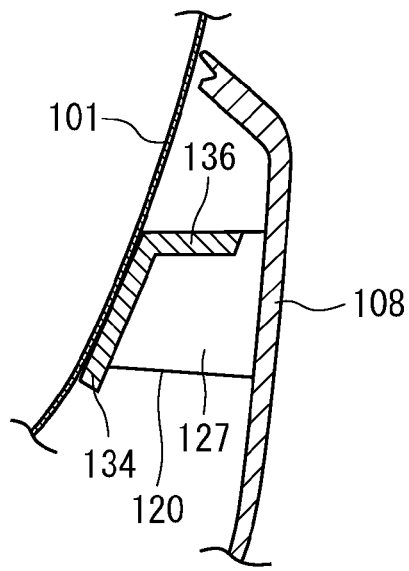
FIGS. 9A and 9B show sectional views along C-C in FIG. 7 and a diagram of first modification example of the coupling portion in FIG. 7.

FIG. 9A is a sectional view along C-C in FIG. 7. A feature of the splash guard 100 according to this embodiment is that it is provided with a coupling portion 132 that couples the rear end wall 127 of the pedestal 120 and the rear wall 110, as shown in FIGS. 5 to 7 and FIG. 9A. As shown in FIG. 9A, the coupling portion 132 includes a first wall 134 facing the side body outer panel 101, and a second wall 136 extending from the end of the first wall 134 toward the elongate portion 108. In FIG. 9A, the second wall 136 does not reach the elongate portion 108, but it is also possible that it contacts the elongate portion 108. In the present embodiment, the coupling portion 132 is provided with two planar walls, namely the first wall 134 and the second wall 136, but there is no limitation to this shape. It is also possible to provide a plurality of connected planar walls having a straight cross-section when viewed from the vehicle longitudinal direction, as in FIG. 9A.

With the configuration of the present embodiment, the rigidity of the rear end portion of the splash guard 100 is increased by the coupling portion 132, which is shaped or molded in a single piece with the splash guard 100, and the shape of the splash guard 100 is stabilized. That is to say, as shown in FIG. 5, the rear wall 110 that is coupled to the pedestal 120 by the coupling portion 132 can cover the flanges 114 and 116 while maintaining a constant clearance D, and without being removed from the first flange 114 and the second flange 116 or coming so close to them that there is a risk of contact. Consequently, components, such as clips, that fix the rear wall 110 to the first flange 114 and the second flange 116, which were conventionally required, are unnecessary. That is to say, even without such a fixation, the clearance D between the flanges 114, 116 and the rear wall 110 is maintained, so that the rear wall 110 can protect these flanges 114, 116 without the occurrence of noise or damage.

In particular, in the case of the present embodiment, in which the mastic sealer 118 for preventing corrosion is applied at the end of the overlapping first and second flanges 114, 116, as shown in FIG. 5, the above-noted effect that the fixation of the rear wall 110 of the splash guard 100 is unnecessary becomes even more conspicuous. If it were necessary to fix the rear wall 110 with clips or the like to the two flanges 114, 116 in FIG. 5, then the rear wall 110 and the two flanges 114, 116 would have to be pierced by the clips at a position shown by the arrow Z. Since the clips would interfere with the portion where the mastic sealer 118 is applied, it would become necessary to provide the countermeasure of extending the two flanges 114, 116 to the vehicle inner side in FIG. 5 and applying the mastic sealer 118 to the elongated end.

However, with the present embodiment, there is no need to fix the rear wall 110 to the first flange 114 and the second flange 116, so that there is no need for this countermeasure. Therefore, there will be no increase in weight due to the extension of the two flanges 114, 116. Moreover, there will also be no deterioration in the yield of the side body outer panel 101 or the rear wheel house outer panel 112 constituting the rear wheel house 104 due to the extension of the two flanges 114, 116.

Furthermore, with the present embodiment, there is no need to arrange a sponge or the like for preventing contact in the clearance D between the two flanges 114, 116 and the rear wall 110. Also with regard to this aspect, a reduction of the number of parts is achieved.

In the present embodiment, the coupling portion 132 is constituted by a plurality of connected planar walls having a straight cross-section, such as the first wall 134 and the second wall 136, as shown in FIG. 9A. This is because, compared with coupling the pedestal 120 and the rear wall 110 with a coupling portion (not shown in the drawings) that is made of a single planar wall, the rigidity of the coupling portion 132 is higher, and also the rigidity of the rear end portion of the splash guard 100 is increased.

First Modification Example of Coupling Portion

Figure 9B:
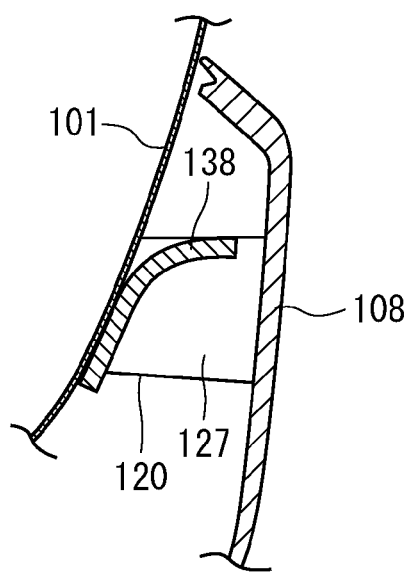

FIG. 9B shows a first modification example of the coupling portion in FIG. 7, and corresponds to FIG. 9A. As shown in FIG. 9B, this coupling portion 138 is constituted by a curved face, and this curved face has a curved cross-section that protrudes convexly toward the side body outer panel 101, when viewed from the vehicle longitudinal direction. In the case that this coupling portion 138 configured with such a curved face is used, the rigidity of the coupling portion is higher, and also the rigidity of the rear end portion of the splash guard 100 is increased compared with the case that the pedestal 120 and the rear wall 110 are coupled with a single planar wall (not shown in the drawings).

Double-Sided Adhesive Tape

As shown in FIG. 5, the first wall 134 of the coupling portion 132 is arranged with a gap of a certain clearance from the side body outer panel 101. A double-sided adhesive tape 140 that adheres the coupling portion 132 to the side body outer panel 101 is inserted into this gap.

With this configuration, the elongate portion 108 of the splash guard 100 can be fixed by the double-sided adhesive tape 140 to the side body outer panel 101 at a position that is closer to the rear end than the clip 128 of the pedestal 120. Therefore, the rear end of the splash guard 100, such as the rear wall 110, can be positioned more reliably.

As shown in FIG. 5, a step 142 is arranged between the coupling portion 132 and the pedestal 120. Due this step 142, the first wall 134 of the coupling portion 132 can be arranged closer to the side body outer panel 101 than the vertical wall 126 of the pedestal 120. However, as noted above, this step 142 is adjusted to such a height that a gap is left to an extent that the double-sided adhesive tape 140 can be inserted between the coupling portion 132 and the side body outer panel 101.

Second Modification Example of Coupling Portion

Figure 10:
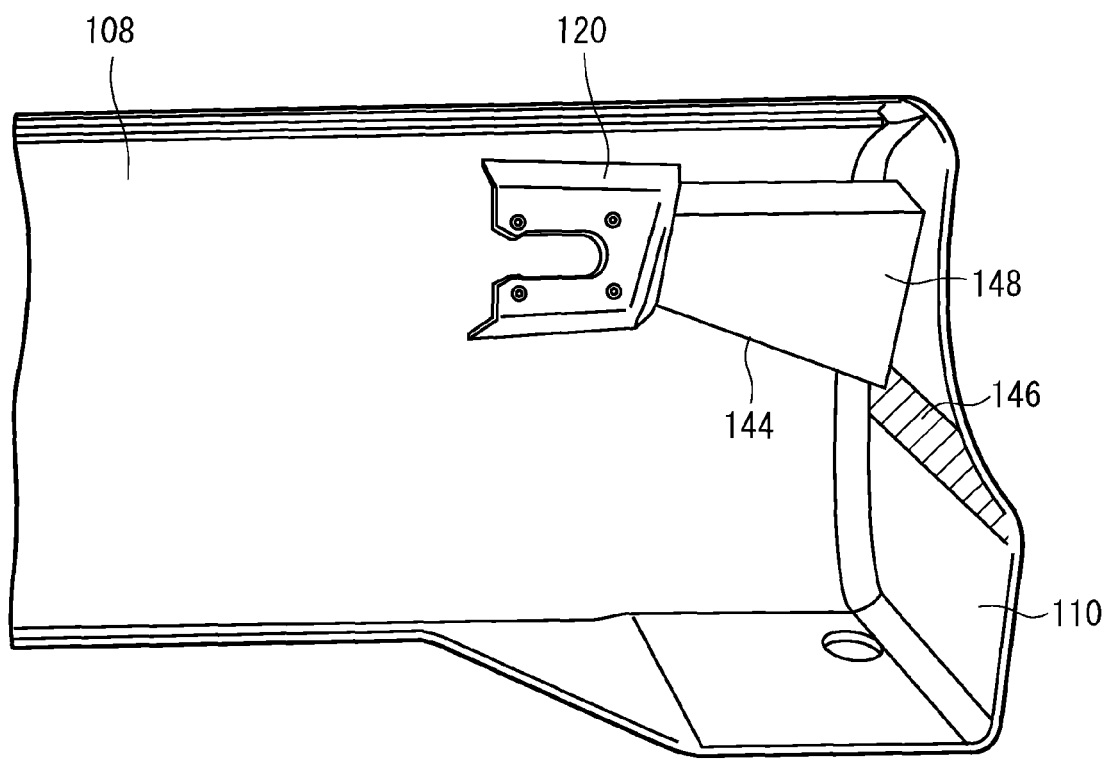
FIG. 10 is a diagram showing a diagram of a second modification example of the coupling portion in FIG. 7.

FIG. 10 is a diagram showing a second modification example of the coupling portion in FIG. 7. The coupling portion 144 in FIG. 10 is coupled to a region 146 of the rear wall 110 that is indicated as a hatched portion and arranged in the middle, with respect to the vertical direction, of the rear wall 110. That is to say, in this modification example, the substantially rectangular first wall 134 in FIG. 7 is expanded, and changed into a substantially trapezoid first wall 148 as shown in FIG. 10. With this modification example, it becomes possible to increase the rigidity of the splash guard and to stabilize the shape of the region 146 in the middle, with respect to the vertical direction, of the rear wall 110, by coupling to the rear wall 110 over a wider range.

In the foregoing, preferable embodiments of the present invention have been described in reference to the accompanying drawings, but naturally the present invention is not limited to such embodiments. It is clear that a person skilled in the art will suitably perform various changes and modifications within the scope of the claims, and naturally it is understood that they are also encompassed with in the technical scope of the present invention.

The present invention can be utilized for vehicle splash guards that cover a side sill of a side body outer panel constituting a side face of a vehicle, the side sill extending between a front wheel house and a rear wheel house.

The invention claimed is:

1. A vehicle splash guard covering a side sill of a side body outer panel constituting a side face of a vehicle, the side sill extending between a front wheel house and a rear wheel house, the vehicle splash guard comprising:
    an elongate portion that extends along the side sill; and
    a rear wall that protrudes from a rear end of the elongate portion into the rear wheel house;
    wherein the rear wall covers a first flange formed by folding over an edge of the rear wheel house to a vehicle inner side, and a second flange formed by folding over an edge of the side body outer panel into the rear wheel house so as to overlap the rear side of the first flange, the rear wall covering the first flange and the second flange from behind with a clearance disposed therebetween;
    the vehicle splash guard further comprising:
        a pedestal formed protruding from a region nearby the rear end of the elongate portion toward the side body outer panel, a clip that is inserted into the side body outer panel being fixed to the pedestal; and
        a coupling portion that couples the pedestal to the rear wall;
    wherein the coupling portion includes a plurality of connected planar walls having a straight cross-section when viewed from a vehicle longitudinal direction;
    wherein the plurality of connected planar walls include a first wall that faces the side body outer panel and a second wall that extends toward the elongate portion from an end of the first wall.

2. The vehicle splash guard according to claim 1, wherein:
    a gap of a predetermined clearance is provided between the coupling portion and the side body outer panel; and
    the vehicle splash guard further comprises a double-sided adhesive tape that is inserted into the gap and adheres the coupling portion to the side body outer panel.

3. The vehicle splash guard according to claim 1, wherein the coupling portion includes a curved wall having a cross-section that curves convexly toward the side body outer panel when viewed from a vehicle longitudinal direction.

4. The vehicle splash guard according to claim 3, wherein:
    a gap of a predetermined clearance is provided between the coupling portion and the side body outer panel; and
    the vehicle splash guard further comprises a double-sided adhesive tape that is inserted into the gap and adheres the coupling portion to the side body outer panel.

5. The vehicle splash guard according to claim 3, wherein the coupling portion is coupled at least to a middle region, with respect to a vertical direction, of the rear wall.

6. The vehicle splash guard according to claim 1, wherein the coupling portion is coupled at least to a middle region, with respect to a vertical direction, of the rear wall.

7. The vehicle splash guard according to claim 1, wherein the coupling portion is coupled at least to a middle region, with respect to a vertical direction, of the rear wall.

\* \* \* \* \*